United States Patent
Dwyer (10) Patent No.: US 7,555,372 B2
(45) Date of Patent: Jun. 30, 2009

(54) METHOD AND APPARATUS TO DISPLAY LANDING PERFORMANCE DATA

(75) Inventor: David B. Dwyer, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 538 days.

(21) Appl. No.: 11/408,674

(22) Filed: Apr. 21, 2006

(65) Prior Publication Data

US 2007/0250224 A1 Oct. 25, 2007

(51) Int. Cl.
*G06F 19/00* (2006.01)
(52) U.S. Cl. .......................... 701/16; 340/969
(58) Field of Classification Search ............. 701/14–16, 701/3–4, 7, 18; 340/969, 959, 976, 963, 340/945, 971–974, 947, 958; 73/178 T; 244/183; 303/126
See application file for complete search history.

(56) References Cited

U.S. PATENT DOCUMENTS

| | | | |
|---|---|---|---|
| 4,368,517 A * | 1/1983 | Lovering | 701/16 |
| 4,454,582 A * | 6/1984 | Cleary et al. | 701/15 |
| 4,843,554 A | 6/1989 | Middleton et al. | |
| 5,047,942 A | 9/1991 | Middleton et al. | |
| 5,343,395 A | 8/1994 | Watts | |
| 5,353,022 A | 10/1994 | Middleton et al. | |
| 5,499,025 A | 3/1996 | Middleton et al. | |
| 6,112,141 A | 8/2000 | Briffe et al. | |
| 6,694,249 B1 | 2/2004 | Anderson et al. | |
| 7,085,630 B2 * | 8/2006 | Ryan et al. | 701/16 |
| 2003/0045994 A1 | 3/2003 | Stratton et al. | |
| 2004/0006412 A1 | 1/2004 | Doose et al. | |
| 2005/0190079 A1 | 9/2005 | He | |
| 2005/0261814 A1 | 11/2005 | Ryan et al. | |

* cited by examiner

*Primary Examiner*—Dalena Tran
(74) *Attorney, Agent, or Firm*—Ingrassia Fisher & Lorenz, P.C.

(57) ABSTRACT

A display system is provided for displaying runway landing data. The system includes a processor and a display device. The processor is adapted to receive data representative of an aircraft landing operation and is operable, in response thereto, to supply one or more image rendering display commands. The display device is coupled to receive the image rendering display commands and is operable, in response thereto, to render an image representative of a runway and a segment of the runway that will be used to land and stop the aircraft during the aircraft landing operation. A method for displaying the runway landing data is also provided.

22 Claims, 5 Drawing Sheets

METHOD AND APPARATUS TO DISPLAY LANDING PERFORMANCE DATA

FIELD OF THE INVENTION

The present invention generally relates to a display for an aircraft, and more particularly relates to a method and apparatus for displaying landing performance data for an aircraft on an aircraft display.

BACKGROUND OF THE INVENTION

Many types of aircraft data are analyzed before aircraft landing takes place on a particular runway. For example, an aircraft flight crew, which may include a single pilot or a pilot and a copilot, analyzes weather data, runway distance data, and other flight-related data to determine whether the particular runway provides a sufficient distance for the aircraft to land. Additionally, the flight crew may need to consider certain federal regulations and procedures that may become applicable in determining landing distances due to the implementation of standard operating procedures (SOPs) set forth by particular aircraft companies, airports, the presence of a specific flying condition, or the limitations of the type of aircraft being operated.

Typically, the aircraft data related to the landing are provided to the flight crew prior to landing. Some of the data, such as the weather data and airport runway assignment are presented from an airport control tower to the flight crew either audibly or in a textual format on a flight display. The flight crew then refers to onboard aircraft performance charts (which can be paper-based or electronically stored) to calculate the distance that may be needed to land and stop the aircraft on the assigned runway. The flight crew mentally compares the needed landing distance with published aeronautical data, which lists the available runway distance, to determine if the flight crew can land the aircraft on the assigned runway.

In an effort to increase airport capacity and improve system efficiency, many airports have implemented one type of landing clearance referred to as a "Land and Hold Short Operation" ("LAHSO"). During a LAHSO the flight crew lands and stops the aircraft on an assigned runway before it intersects another runway, taxiway, or some other designated point. A flight crew accepting this type of landing clearance will first insure the aircraft can land and stop within an "Available Landing Distance" ("ALD"). The decision regarding whether to accept a LAHSO clearance for a particular runway typically needs to be made relatively quickly. Typically, onboard aircraft performance charts and published aeronautical data are in a textual format. As a result, the likelihood of human error may increase, potentially resulting in flight crews accepting LASHO clearances when, in fact, they should not.

Accordingly, it is desirable to have a system that presents aircraft landing data and results obtained therefrom in a manner that is more easily interpreted by the flight crew. In addition, it is desirable for the system to be simple to implement and use. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A display system is provided for displaying landing performance data for an aircraft. The system includes a processor and a display device. The processor is adapted to receive data representative of an aircraft landing and is operable, in response thereto, to supply one or more image rendering display commands. The display device is coupled to receive the image rendering display commands and is operable, in response thereto, to render an image representative of both a runway and of a segment of the runway that will be used to land and stop the aircraft during the aircraft landing.

A method of displaying landing data of an aircraft on a display system is also provided. The method includes processing data representative of an aircraft landing, calculating a percentage of an available landing distance of a runway that will be used to land and stop the aircraft during the aircraft landing based at least in part on the processed aircraft landing data, and displaying an image representative of the runway and a segment on the runway, the segment representing the calculated percentage of the runway, on the display system.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
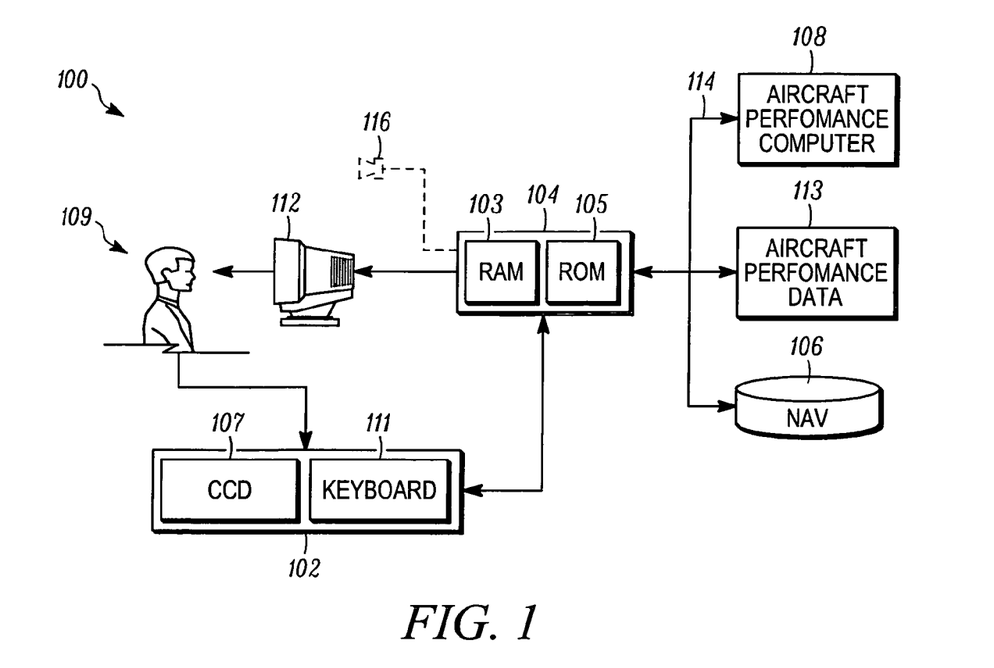
FIG. 1 is a functional block diagram of a flight deck display system according to one embodiment of the present invention.

Turning now to the description, and with reference to FIG. 1, an exemplary display system will be described. The system 100 is configured to provide one or more images representative of both a runway and of a segment of the runway that will be used to land and stop the aircraft during an aircraft landing. The system 100 is described in terms of functional block diagrams and various processing steps; however, it should be appreciated that such functional blocks may be realized in many different forms of hardware, firmware, and/or software components configured to perform the various functions. For example, the system 100 may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Returning to the description, the system 100 includes at least a user interface 102, a processor 104, one or more navigation databases 106, an aircraft performance computer 108, and a display device 112. The user interface 102 is in operable communication with the processor 104 and is configured to receive input from a user 109 (e.g., a flight crew) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 110. The user 109 uses the CCD 107 to, among other things, move a cursor symbol on the display screen, and may use the keyboard 110 to, among other things, input various data.

The processor 104 is in operable communication with the aircraft performance computer 108 and the display device 112 via, for example, a communication bus 114. The processor 104 is coupled to receive various types of data from the aircraft performance computer 108 and may additionally receive navigation data from one or more of the navigation databases 106, and is operable to supply appropriate display commands to the display device 112 that cause the display device 112 to render various images. Though not shown in FIG. 1, it will be appreciated that the processor 104 may additionally be coupled to receive various data from one or more other external systems. For example, the processor 104 may also be in operable communication with a source of weather data (including wind speed, wind direction, presence and location of precipitation events), a terrain avoidance and warning system (TAWS), a traffic and collision avoidance system (TCAS), an instrument landing system (ILS), and a runway awareness and advisory system (RAAS), just to name a few. If the processor 104 is in operable communication with one or more of these external systems, it will be appreciated that the processor 104 is additionally configured to supply appropriate display commands to the display device 112 so that the data supplied from these external systems may also be selectively displayed on the display device 112. In some embodiments, the processor 104 is in operable communication with an audible warning device 116, and is configured to supply sound emitting commands thereto in certain circumstances.

The processor 104 may include one or more microprocessors, each of which may be any one of numerous known general-purpose microprocessors or application specific processors that operate in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, aircraft departure and approach information, protected airspace data, and airport data related to different airports including, for example, published aeronautical data, airport maps, data on fixed airport obstacles (tower, buildings and hangars), taxiways and runways of interest, an airport designator for identifying an airport, runway and taxiway width and length values, positions of taxiways and runways, runway survey data, including runway center point, runway centerline and both runway endpoints. It will be appreciated that, although the navigation databases 106 are, for clarity and convenience, shown as being stored separate from the processor 104, all or portions of these databases 106 could be loaded into the on-board RAM 103, or integrally formed as part of the processor 104, and/or RAM 103, and/or ROM 105. The navigation databases 106, or data forming portions thereof, could also be part of one or more devices or systems that are physically separate from the display system 100.

The aircraft performance computer 108 is in operable communication, via the communication bus 114, with various data sources including, for example, the navigation databases 106 and one or more sources of aircraft performance data 113, and is used, among other things, to allow the user 109 to selectively receive or retrieve data therefrom. The aircraft performance data 113 includes various types of performance-related data including, for example, aircraft fuel supply data, aircraft weight, passenger load data, various types of data representative of the current aircraft state, such as aircraft speed, altitude, heading, the particular aircraft category, and other types of similar data. The data is then supplied to or retrieved by the processor 104, via the communication bus 114. The processor 104 in turn processes the data to thereby supply appropriate display commands to the display device 112. It will additionally be appreciated that all or portions of the data mentioned herein may be entered manually by a user, such as the user 109. Moreover, it will be appreciated that the aircraft performance computer 108 may have a separate processor (not shown) that processes the aircraft performance data before it is supplied to the processor 104 or the processor 104 may be embedded within the aircraft performance computer 108 itself, or vice-versa.

The display device 112 is used to display various images and data, in both a graphical and a textual format, and to supply visual feedback to the user 109 in response to the user input commands supplied by the user 109 to the user interface 102. It will be appreciated that the display device 112 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display device 112 includes a panel display. To provide a more complete description of the method that is implemented by the display system 100, a general description of the display device 112 and its layout will now be provided.

Figure 2:
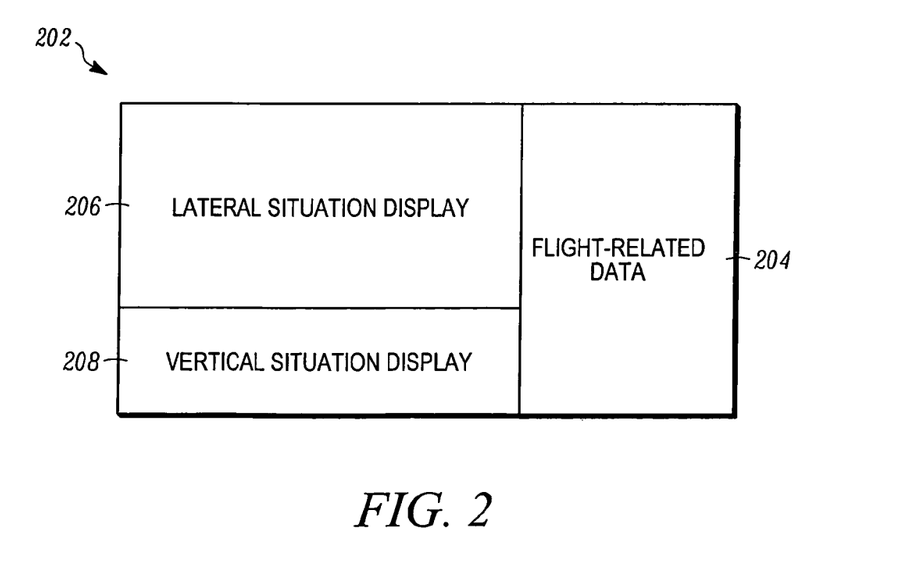
FIG. 2 is a simplified representation of an exemplary display screen that may be used in the system of FIG. 1, which shows the overall layout of the display screen, and on which is various images may be simultaneously displayed.

FIG. 2 shows the display device 112 and includes a display area 202 in which multiple graphical and textual images may be simultaneously displayed, preferably in different sections of the display area 202. For example, general flight-related data 204, a lateral situation display 206, and a vertical situation display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards.

The lateral situation display 206 provides a two-dimensional lateral situation view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view symbol and a side-view aircraft symbol, respectively, in addition to various symbols representative of the current flight plan, various navigation aids, and various map features below and/or ahead of the current flight path such as, for example, terrain, runways, and political boundaries. It will be appreciated that the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process the data it receives from the navigation databases 106 and/or the aircraft performance computer 108 and render the views displayed therein.

It was noted above that the flight-related data 204, the lateral situation display 206, and the vertical situation display 208 may be displayed either alone or in various combinations. Hence, before proceeding further with the description, it should be appreciated that, for clarity and ease of explanation and depiction, in each of the figures referenced below only the lateral situation display 206 and the vertical situation display 208, either alone or in combination, are shown being displayed in the display area 202 of the display device 112.

Figure 3:
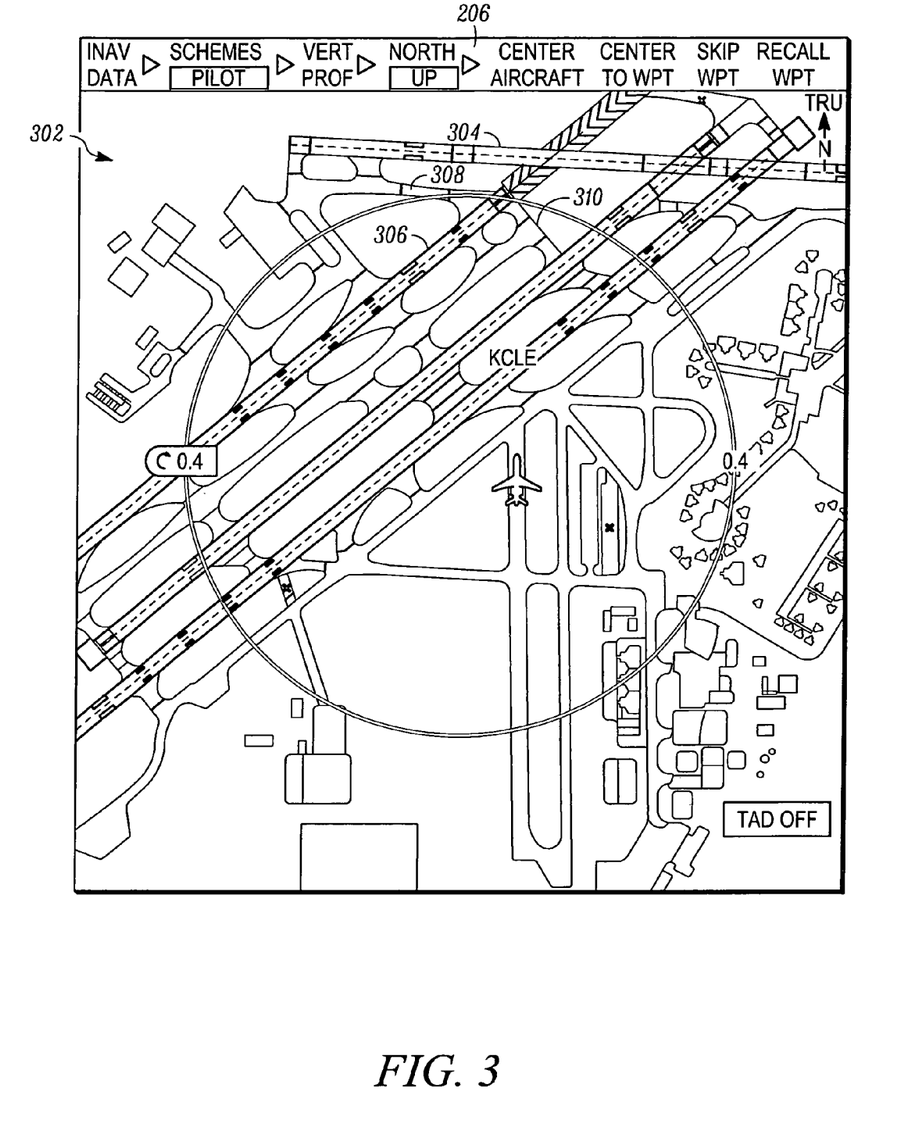
FIG. 3 is an exemplary display screen that depicts a lateral situation view of an airport map.

Returning now to the description, as was previously noted, the user 109 is responsible for determining whether a runway assigned to the aircraft for landing provides a sufficient distance for the landing and stopping. Thus, the processor 104 receives airport data from the navigation database 106 and supplies display commands that cause the lateral situation display 206, in addition to or instead of one or more of the features mentioned above, to render a two-dimensional lateral situation view of an airport map 302, as shown in FIG. 3. Alternatively, although not shown, the processor 104 can be configured to supply display commands that cause the vertical situation display 208 to render a perspective view of the airport map 302. The airport map 302 preferably includes one or more runways 304, 306 and may include taxiways 308, 310 and other airport features that may surround the runways 304, 306.

Figure 4:
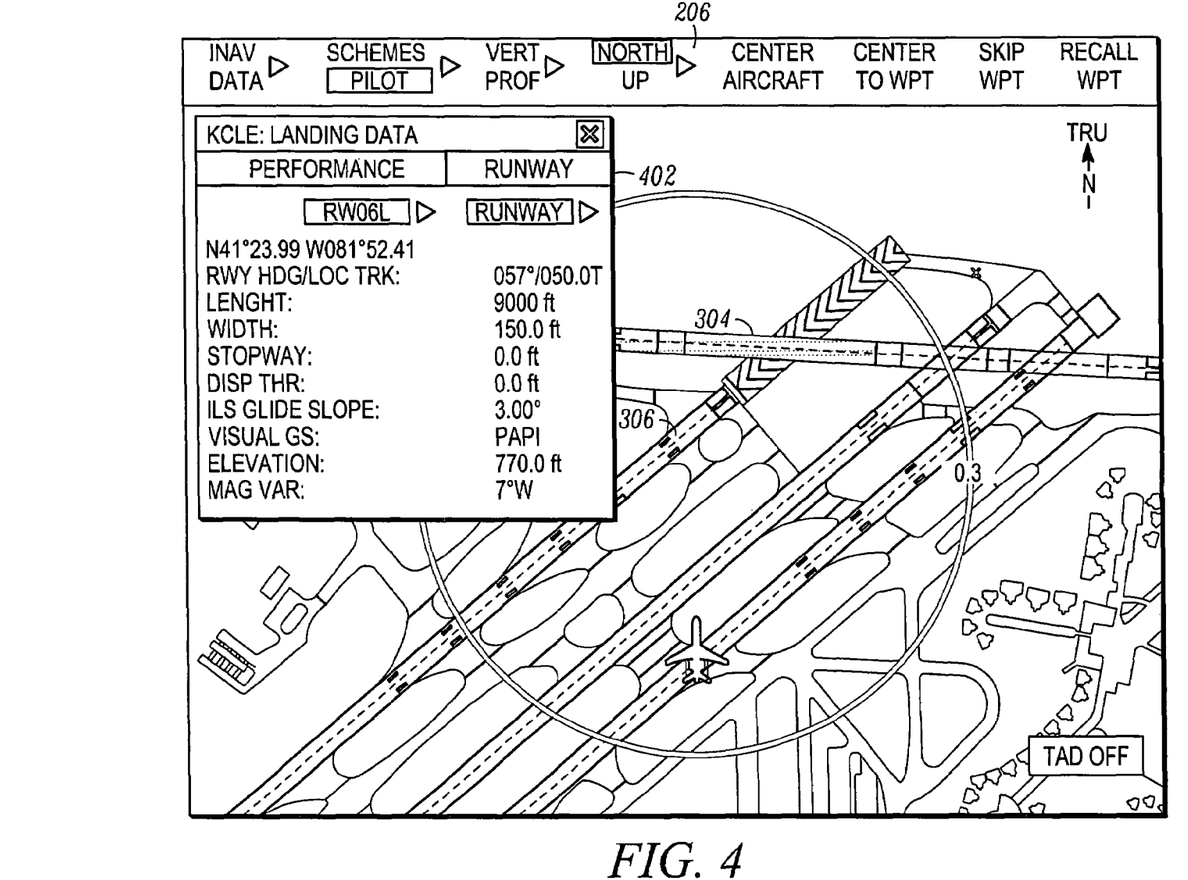
FIG. 4 is an exemplary display screen that depicts a close up, lateral situation view of the airport map including a selected runway and various other features.

At any time during aircraft operation, different views of the airport map 302 may be rendered by the display 206. The views may change, for example, in response to user 109 input. For example, the user 109 may choose to view a particular runway 304 and thus may input appropriate data to the processor 104 via the user interface 102. In one exemplary embodiment, the processor 104 provides, in response to the input data, commands to the display 206 to provide a close-up view of and highlight the selected runway 304 on the airport map 302. In another exemplary embodiment, the user 109 may use the CCD 107 to select a runway 304, and the display 206 may provide a second screen or window in which a close-up view of the selected runway 304 is depicted. An exemplary close-up view is shown in FIG. 4. As FIG. 4 shows, a smaller pop-up window 402 may be simultaneously displayed within the screen textually and/or or numerically showing pertinent runway-related data available from the navigation databases, such as runway width and length values and runway distances available for an aircraft landing. In other embodiments, the processor 104 may provide commands to display surrounding features, such as taxiways or obstacles, to provide context to the user 109 when viewing the selected runway 304.

Figure 5:
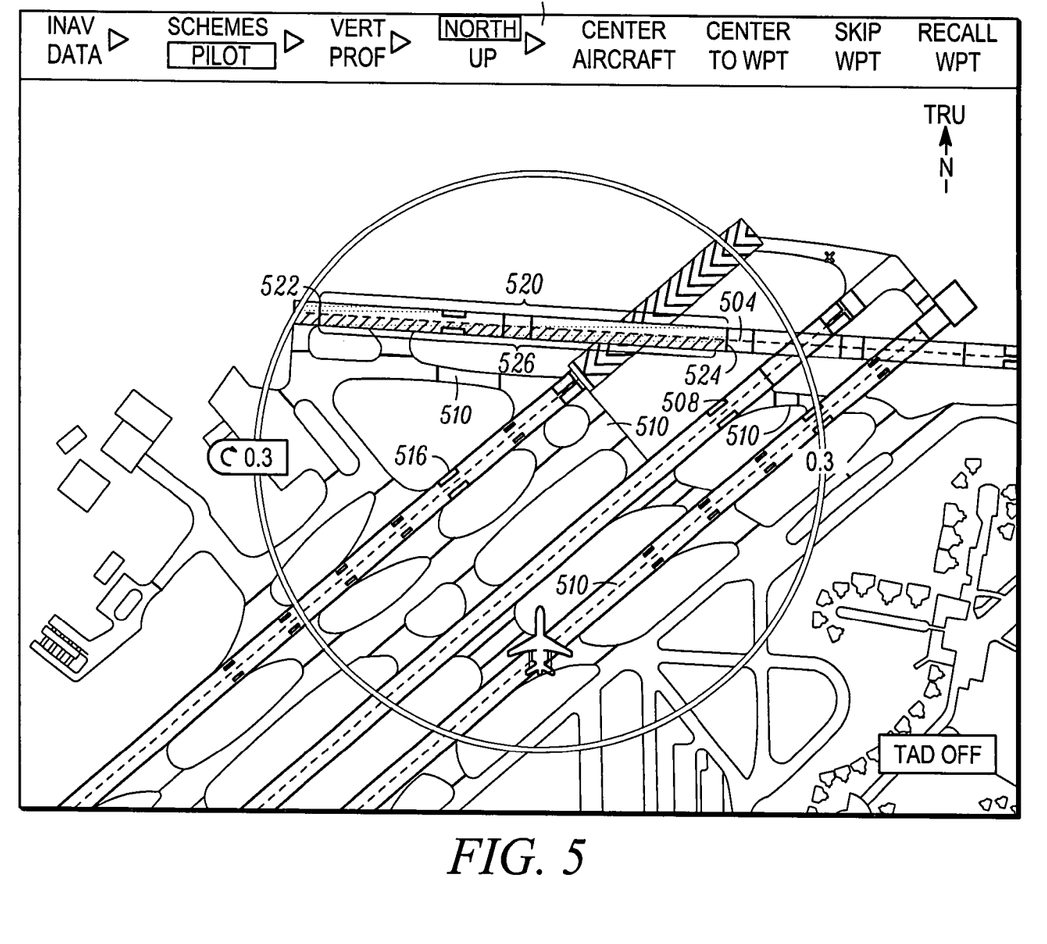
FIG. 5 is an exemplary display screen that depicts a close up, lateral situation view of the selected runway showing an exemplary percentage of the runway that will be needed for use by the aircraft during an aircraft landing.

When the user 109 prepares an aircraft for landing, an airport control tower provides communication identifying an assigned runway on which the aircraft may land. In one exemplary embodiment, the communication is provided to the user 109 who inputs the received communication into the system 100 via the user interface 102; alternatively, the processor 104 is in communication with and may be linked to the airport control tower and receives the communication directly. After the runway assignment is received, the processor 104 processes data associated with the assigned runway to determine a segment of the assigned runway, and most preferably a percentage thereof, that will be used to land and stop the aircraft during the aircraft landing. The aircraft landing data includes, in part, data from the navigation database 106, including airport data related to the assigned runway, such as runway length and width values, runway endpoints, weather data, precipitation data, wind speed, wind direction, barometric altimeter setting data, and surface air temperature data and data from the aircraft performance database 113, including aircraft weight, passenger load data, aircraft category data, and other data. The processor 104 then supplies image rendering commands to the display 206 to display, in addition to the features shown in FIG. 3, the assigned runway 504 and the determined percentage of the assigned runway 504. The determine percentage is represented on the display 206 as a segment 520 of the runway 504, as shown in FIG. 5. In many cases, the assigned runway 504 may overlap one or more additional runways 508 and both runways 504, 508 may be in use. Thus, the display 206 includes a diagram of the assigned and adjacent runways 504, 508, and may also include depictions of taxiways 510 that are proximate the runways 504, 508.

As briefly mentioned above, after the appropriate data is processed, the display 206 displays the segment 520 of the assigned runway that will be used to land and stop the aircraft during the aircraft landing. Preferably, the segment 520 extends from a first endpoint or line 522, which represents the location at which the aircraft is expected to begin landing, to a second endpoint or line 524 on or off of the assigned runway 504, where the aircraft is expected to stop. The segment 520 of the assigned runway may be depicted in any one of numerous manners, such as, for example, as a colored line, a highlighted portion of the assigned runway 504, a texture on the runway symbol such as hashmarks, dots, or other symbols, a square outline around the perimeter of the runway, a bar (as shown in FIG. 5) or any one of various other symbols indicating the portion of the runway that will be required for landing the aircraft. Although not depicted, the segment 520 may also be colored.

Although a single segment 520 is described above, more than one segment 520 may be calculated by the processor 104 and displayed so that the user 109 may compare distance availability under a variety of conditions. For example, a first segment 520 representative of a distance needed to land when the aircraft is subjected to a first predetermined parameter may be processed and displayed, while a second segment 526 representative of a distance needed to land when the aircraft is subjected to a second predetermined parameter may be simultaneously processed and displayed. The predetermined parameters may be different weather conditions, such as, for example, an uncontaminated versus a contaminated condition (e.g. a dry versus a wet condition), a wind or a no wind condition, a no tailwind versus a high crosswind or a tailwind condition. In other embodiments, first and second segments 520, 526 representative of a first distance needed for landing a first type of aircraft and a second distance needed for landing a second type of aircraft, may be simultaneously processed and displayed. The comparison between the first and second segments 520, 526 may be represented in any one of numerous manners, such as, as two color bars, or different shading, texturing or lines.

As briefly mentioned above, the second endpoint or line 524 may appear on or off of the assigned runway 504 such that the segment 520 appears to be greater than a total distance of the assigned runway 504. For example, the second endpoint or line 524 may appear to extend onto a taxiway or another runway 508, indicating that the assigned runway 504 does not provide a sufficient distance for the aircraft to land. In these instances, the segment 520 may be represented in another color, such as red, or have a different texture or shading, informing the user 109 of the insufficient runway distance. Alternatively, the segment 520 may flash or the system 100 may provide an audible sound to the user 109 via the audible warning device 116.

In one exemplary embodiment, as depicted in FIG. 5, a third endpoint or line 526 is included that represents an end of an "Available Landing Distance" ("ALD") designated for a long and hold short operation ("LAHSO"). As briefly mentioned above, LAHSO requires the user 109 to land and stop the aircraft within an ALD to avoid intersecting with one or more runways, taxiways, or other designated points. In this regard, the third endpoint 526 indicates to the user 109 where on the assigned runway 504 he must stop. In one example, the segment 520 extends across a portion of the assigned runway 504 and the second endpoint 524 is disposed between the first and the third endpoints 522, 526 indicating that the aircraft is able to land and stop within the ALD. In another example, the segment 520 may appear to extend beyond the third endpoint 526 such that the third endpoint 526 is disposed between the first and second end points 522, 524. Such an embodiment would indicate to the user 109 that the aircraft would not be able to land and stop within the ALD.

In some embodiments, the processor 104 may receive data from the airport control tower or from user input that the third endpoint 526 is the end of an ALD. The processor 104 may be further configured to supply commands to the display 106 to display the segment 520 in another color and a different texture or shading, informing the user 109 of the insufficient distance. Alternatively, the segment 520 may flash or the system 100 may provide an audible sound to the user 109 via the audible warning device 116. In other embodiments, the processor 104 may be configured to supply commands to the display 106 when the second endpoint 524 is disposed between the first and third endpoints 522, 526 and a distance between the second and third endpoints 524, 526 is less than a predetermined distance.

Figure 6:
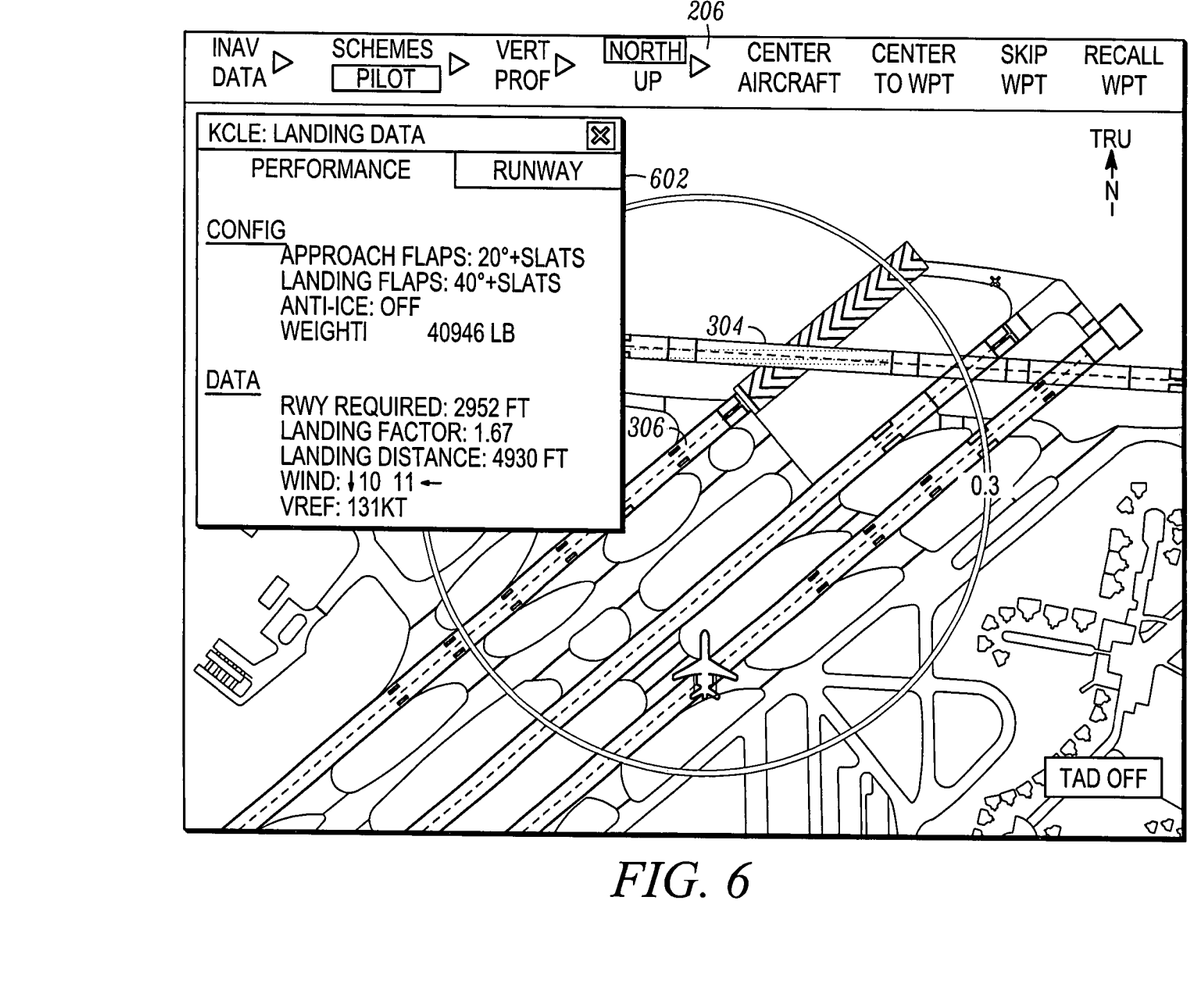
FIG. 6 is another exemplary display screen that depicts a close up, lateral situation view of the airport map including the selected runway and various other features.

In some cases, the user 109 may want to review the segment 520 data in a textual and numerical format. Thus, the user 104 can use the CCD 107 to make a runway 304 selection, and the display 206 may provide a second screen in which a close up view of the selected runway 304 is depicted, as shown in FIG. 6. A smaller pop-up window 602 may be simultaneously displayed within the screen textually and/or or numerically showing pertinent segment 520 data available from the navigation databases, such as runway distance needed for landing and stopping, wind data, aircraft weight, and other pertinent data, as shown in FIG. 6.

After visually processing the information on the display 206, the user 109 can determine whether he can land and stop the aircraft on the assigned runway 504, or whether he can land and hold short of an adjacent or overlapping runway. The user 109 then informs the control tower whether he accepts or rejects use of the assigned runway 504. In some embodiments, other available runways 516, 518 (see FIG. 5) may be displayed along with the assigned runway 504. Percentages showing the distance needed for landing and stopping on those runways 516, 518 may also be displayed thereon so that if the user 109 rejects landing on the assigned runway 504, another runway 516, 518 could be proposed to the airport control tower.

A display system 100 has now been provided that allows the pilot to visualize a distance needed to land an aircraft. Visualization of the distances allows the pilot to more quickly determine whether to use an assigned runway. The system is easy to use and may be retrofitted into existing aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for displaying landing performance data for an aircraft, the system comprising:
   a processor adapted to receive precipitation data and data representative of an aircraft landing and operable, in response thereto, to supply one or more image rendering display commands; and
   a display device coupled to receive the image rendering display commands and operable, in response thereto, to render an image representative of (i) a runway and (ii) a segment of the runway that will be used to land and stop the aircraft.

2. The system of claim 1, wherein the runway segment comprises one of a bar, a line, texturing extending at least a portion of the runway image.

3. The system of claim 2, wherein the display device is further configured, in response to the image rendering display commands, to render images representative of:

a first runway segment representing a percentage of the runway that will be used by the aircraft when the aircraft is subjected to a first set of predetermined parameters; and a second runway segment representing a percentage of the runway that will be used by the aircraft when the aircraft is subjected to a second set of predetermined parameters.

4. The system of claim 1, wherein the runway segment extends between a first endpoint and a second endpoint.

5. The system of claim 4, wherein the display device is further configured, in response to the image rendering display command, to render an image representative of a third endpoint representing an end of an available landing distance of the runway.

6. The system of claim 5, wherein:
the third endpoint is displayed within the segment;
the processor is operable, in response to the data representative of the aircraft landing, to supply one or more warning image rendering commands; and
the display device is further configured, in response to the warning image rendering commands, to display an information image representative thereof.

7. The system of claim 5, wherein:
the third endpoint is displayed outside of the segment;
the processor is configured to calculate a distance between the second and third endpoints, and operable, in response to the calculation, to supply one or more warning image rendering commands; and
the display device is further configured, in response to the warning image rendering commands, to display one or more information images representative thereof.

8. The system of claim 1, wherein the processor is operable, in response to the data representative of the aircraft landing, to supply one or more warning image rendering commands and the display device is further configured, in response to the warning image rendering commands, to display an information image when the segment extends across and exceeds the runway image.

9. The system of claim 8, wherein the information image comprises a portion of the segment.

10. The system of claim 1, wherein the processor is operable, in response to the data representative of the aircraft landing, to supply one or more sound commands and the system further comprises an audible emission device in operable communication with the processor to receive the sound commands and, in response thereto, to emit an audible sound when the segment extends across and exceeds the runway image.

11. The system of claim 1, wherein the processor is adapted to receive aircraft landing data comprising weather data and is operable in response thereto, to supply one or more weather image rendering display commands, and the display device is coupled to receive the display commands and is operable, in response thereto, to render and simultaneously display (i) an image representative of a segment of the runway that would be needed for use by the aircraft if the aircraft were subjected to a first environmental condition and (ii) an image representative of a segment of the runway that would be needed for use by the aircraft, if the aircraft were subjected to a second environmental condition.

12. The system of claim 1, wherein the processor is adapted to receive a user input for selecting a portion of the data representative of the aircraft landing and operable, in response thereto, to supply a text box image rendering command, and the display device is coupled to receive the text box image rending commend and operable, in response thereto, to render at least one image representative of a text box comprising the selected portion of the data representative of the aircraft landing.

13. The system of claim 1, wherein the processor is adapted to receive weather data and to supply one or more weather image rendering display commands, and the display device is coupled to receive the weather image rending display commands and operable, in response thereto, to render an image representative of the weather data.

14. A method of displaying landing data of an aircraft on a display system, the method comprising the steps of:
processing precipitation data representative of an aircraft landing;
calculating a percentage of an available landing distance of a runway that will be used to land and stop the aircraft during the aircraft landing based at least in part on the processed aircraft landing data; and
displaying an image representative of the runway and a segment on the runway, the segment representing the calculated percentage of the runway, on the display system.

15. The method of claim 14, wherein the step of displaying comprises displaying the segment as one of a bar, line, or texturing that extends a portion of the runway.

16. The method of claim 15, wherein the step of displaying further comprises displaying the segment to extend beyond the runway.

17. The method of claim 16, further comprising:
informing a flight crew that the segment extends beyond the runway.

18. The method of claim 16, wherein the segment includes a first endpoint and a second endpoint and the method further comprises displaying a third endpoint representing an end of the available landing distance of the runway.

19. The method of claim 18, further comprising:
informing a flight crew, if the third endpoint is between the first and the second endpoints.

20. The method of claim 19, 8urther comprising:
informing a flight crew, if the third endpoint is outside of the first and the second endpoints and a distance between the second and third endpoints is less than a predetermined distance.

21. The method of claim 14, wherein:
the step of processing data further comprises processing data representative of a first weather condition and a second weather condition; and
the step of calculating further comprises calculating a percentage of the runway that will be used to land and stop the aircraft, if the aircraft were subjected to the first weather condition, and calculating a percentage of the runway will be used to land and stop the aircraft, if the aircraft were subjected to the second weather condition; and
the step of displaying further comprises displaying an image representative of the calculated percentages.

22. A display system for displaying landing performance data for an aircraft, the system comprising:
a processor adapted to receive precipitation data and data representative of an aircraft landing and operable, in response thereto, to supply one or more image rendering display commands; and
a display device coupled to receive the image rendering display commands and operable, in response thereto, to render an image representative of (i) a runway, (ii) a first runway segment representing a percentage of the runway that will be used by the aircraft when the aircraft is subjected to a first set of predetermined parameters; and (iii) a second runway segment representing a percentage of the runway that will be used by the aircraft when the aircraft is subjected to a second set of predetermined parameters.

* * * * *

UNITED STATES PATENT AND TRADEMARK OFFICE
CERTIFICATE OF CORRECTION

PATENT NO. : 7,555,372 B2  Page 1 of 1
APPLICATION NO. : 11/408674
DATED : June 30, 2009
INVENTOR(S) : Dwyer It is certified that error appears in the above-identified patent and that said Letters Patent is hereby corrected as shown below:

Column 10, line 33, "8urther" should be changed to --further--

Signed and Sealed this

Eighth Day of September, 2009

David J. Kappos
*Director of the United States Patent and Trademark Office*